Dec. 25, 1934.  H. WILSON ET AL  1,985,706
METHOD OF AND APPARATUS FOR CONTROLLING ELECTRIC MOTORS
Filed Sept. 13, 1933  2 Sheets-Sheet 1
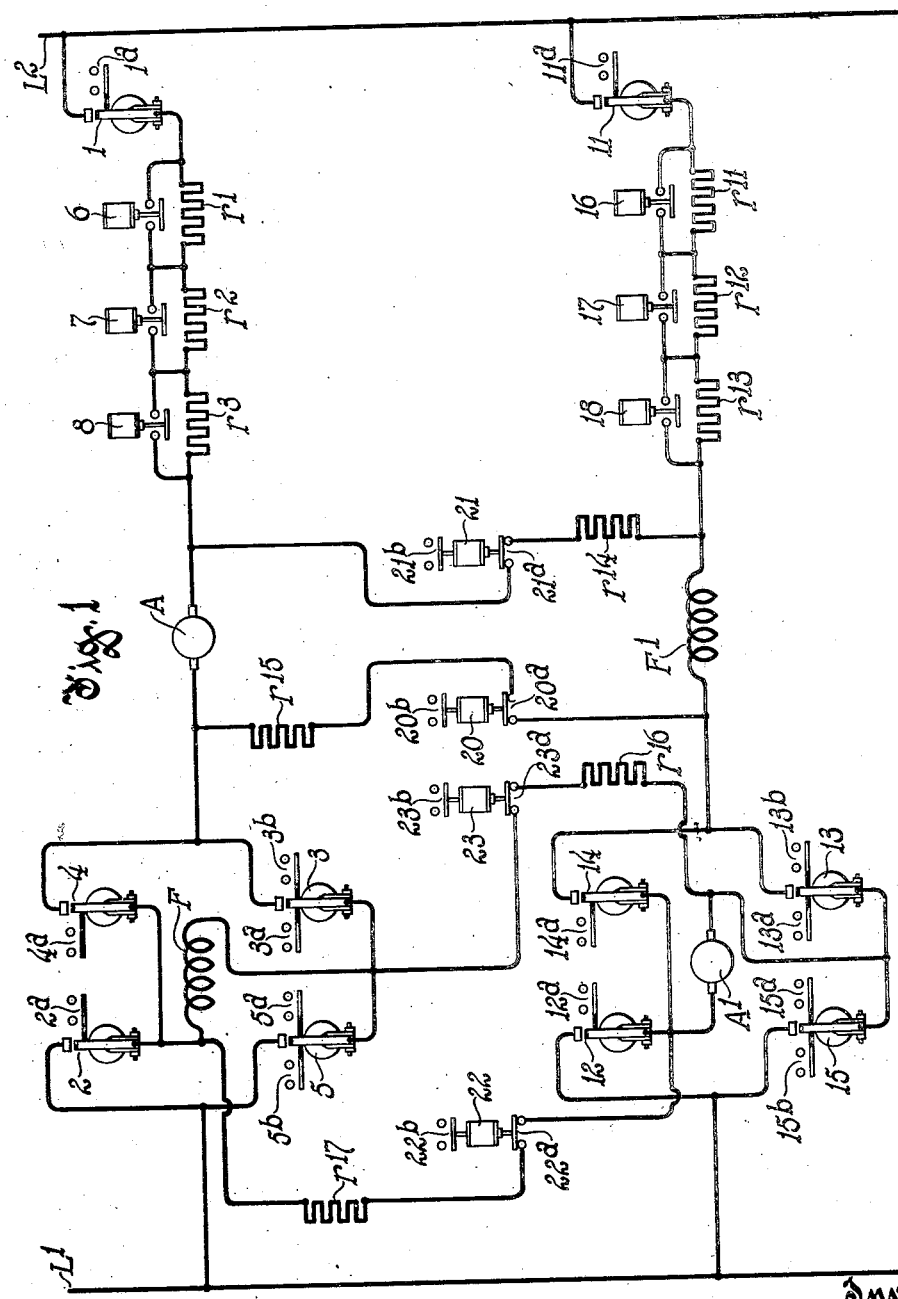
Inventors
Herman Wilson
Charles Ritchie
By Frank H. Hubbard
Attorney

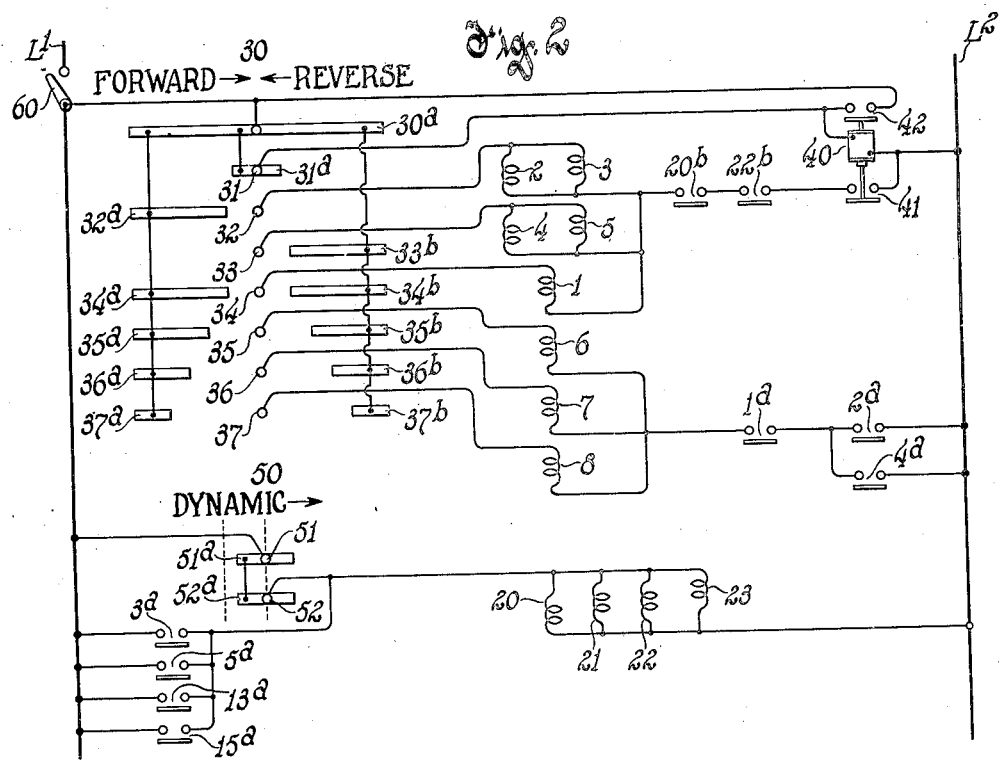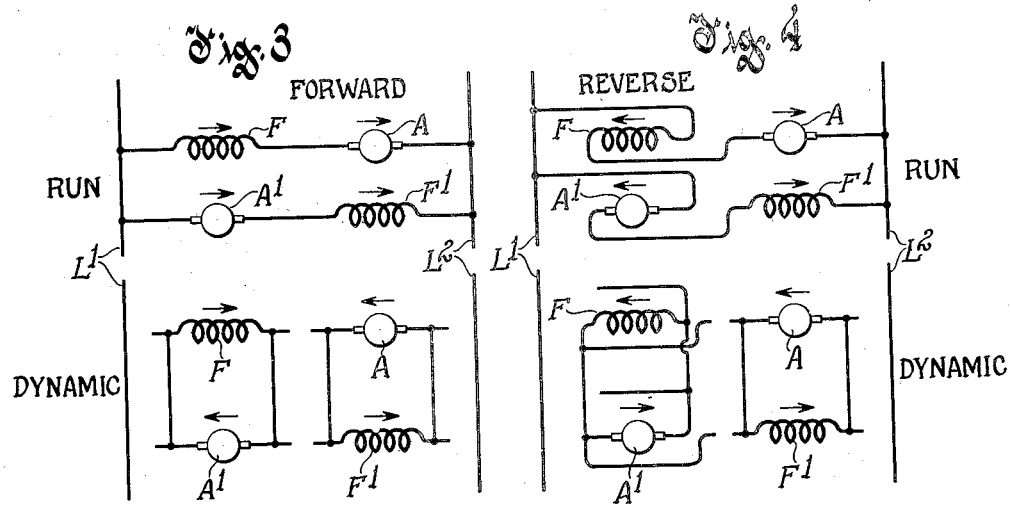

Patented Dec. 25, 1934

1,985,706

UNITED STATES PATENT OFFICE 1,985,706

METHOD OF AND APPARATUS FOR CONTROLLING ELECTRIC MOTORS

Herman Wilson and Charles Ritchie, Youngstown, Ohio, assignors to Cutler-Hammer, Inc., Milwaukee, Wis., a corporation of Delaware Application September 13, 1933, Serial No. 689,208

10 Claims. (Cl. 172—179)

This invention relates to improvements in dynamic braking control for electric motors, and more particularly for series wound motors.

In practice there are instances where it is desired to use for driving purposes a pair of series motors, to reverse said motors for reversal of the driven mechanism and to render both motors effective for dynamic braking when overhauled in either direction, and the present invention has among its objects to provide an improved method of effecting the desired dynamic braking by both motors of such a double motor drive.

Another object is to provide simple and reliable means for carrying out such method.

Another object is to provide control means which will function on failure of the power supply to the motors to render the motors effective for dynamic braking when overhauled in either direction.

Various other objects and advantages of the invention will hereinafter appear.

According to the present invention it is proposed to effect dynamic braking by the motors when overhauled in either direction by providing closed loops each having therein in series relation an armature of one of the motors and a field winding of another of the motors, provision being made to avoid need of a rate of decay of current in one loop differing from the rate of decay of current in another loop to insure the desired dynamic braking under all conditions.

The accompanying drawings illustrate diagrammatically one embodiment of the invention which will now be described, it being understood that the invention is susceptible of various modifications without departing from the scope of the appended claims.

In the accompanying drawings Figure 1 shows diagrammatically a double motor drive and control means therefor designed particularly for ladle crane control.

Fig. 2 shows control circuits for certain of the electromagnetic switches shown in Fig. 1.

Fig. 3 shows simplified diagrams having indicated thereon the direction of current flow through the elements of the two motors when the motors run in one direction and when the motors function for dynamic braking in such direction, and Fig. 4 shows simplified diagrams having indicated thereon the direction of current flow through the elements of the two motors when the motors run in a reverse direction to that aforementioned and when the motors function for dynamic braking in such reverse direction.

Referring to Fig. 1, the same illustrates two motors respectively provided with armatures A and $A^1$, and series field windings F and $F^1$. The motors are arranged to be supplied with current from lines $L^1$—$L^2$ and are provided with like control elements for effecting starting thereof in either direction and to effect their acceleration.

The controller for motor A—F as shown comprises an electromagnetic main switch 1 and electromagnetic switches 2, 3, 4 and 5 providing for reversals in current flow between the motor armature A and its field F, switches 2 and 3 affording control for operation of the motor in forward direction, and switches 4 and 5 affording control for reverse operation of the motor. Also the controller comprises resistances $r^1$, $r^2$ and $r^3$ in series with the motor and electromagnetic switches 6, 7 and 8 for short-circuiting said resistances, respectively. The controller for motor $A^1$—$F^1$ has an electromagnetic main switch 11 and reversing switches 12, 13, 14 and 15 corresponding to the main and reversing switches of the aforedescribed controller. Also the controller for motor $A^1$—$F^1$ has resistances $r^{11}$, $r^{12}$ and $r^{13}$ and short-circuiting switches 16, 17 and 18 corresponding to the resistances and resistance controlling switches of the aforedescribed controller. As will be understood, certain features with which such controllers are customarily provided have been omitted for simplicity of illustration.

As will be apparent, the control means described provides for connection of both motors across lines $L^1$—$L^2$ through their respective resistances and for reversal of both motors, motor A—F being reversed by reversal of current through its field and motor $A^1$—$F^1$ by reversal of current through its armature. Also the controllers provide for acceleration of the motors by energization of the aforedescribed resistance controlling switches progressively. Preferably the aforedescribed control switches are provided with a common master such as that hereinafter described to provide for starting and acceleration thereof in unison.

Considering now the dynamic braking means shown in Fig. 1, the same comprises an electromagnetic switch 20 having normally closed main contacts $20^a$ to complete a connection between the armature A and the field winding $F^1$, an electromagnetic switch 21 having normally closed main contacts $21^a$ to establish a connection from the other side of the armature A to the other side of field winding $F^1$, an electromagnetic switch 22 having normally closed main contacts $22^a$ to establish a connection between the armature A¹ and the field winding F and an electromagnetic switch 23 having normally closed main contacts 23ᵃ to establish a connection from the other side of armature A¹ to the other side of the field winding F¹.

Thus it will be observed that switches 20, 21, 22 and 23 when deenergized will establish two closed loops as indicated in the simplified diagram of Fig. 3 designated "Dynamic", each loop including the armature of one of the motors and the field of the other motor. Also it will be apparent that if when the motors are operating in forward direction current flows through their armatures and windings as indicated by the arrows of the diagram of Fig. 3 designated "Run" then when the motors are overhauled in forward direction the current delivered by armatures A and A¹ with dynamic braking connections established will flow as indicated in the other diagram of Fig. 3 and will traverse the field windings in the same direction as the current supplied for forward operation. Hence the dynamic braking current generated will maintain excitation of both fields for effective dynamic braking by the motors jointly.

On the other hand, assuming reverse operation of the motors on power supplied from the line, current will flow through the motor armatures and field windings as indicated by the arrows of the diagram of Fig. 4 designated "Run" and hence when the motors are overhauled in the reverse direction dynamic braking current supplied by the motor armatures with dynamic braking connections established will flow as indicated on the diagram of Fig. 4 designated "Dynamic", and due to the fact that reversal of one motor was brought about by reversal of armature current while reversal of the other motor was brought about by reversal of field current, each armature supplies current to the field of its respective loop in that direction in which it was supplied by reverse power connections. Thus the motors will again provide for effective dynamic braking thereby jointly, without necessity of providing for different rates of current decay in the two loops, as is necessary where initially one armature tends to demagnetize the field winding of its respective loop, and without the delay there involved in obtaining maximum dynamic braking.

As shown in Fig. 1, the loop including armature A and field F¹ is provided with resistances $r^{14}$ and $r^{15}$, while the loop including armature A¹ and field F is provided with resistances $r^{16}$ and $r^{17}$. However, it is to be understood that while such resistances are shown as fixed resistances it is contemplated that certain of the same be variable for regulation of dynamic braking or that each loop be provided with only fixed resistance comprising a single resistor.

For control purposes certain of the aforementioned electromagnetic switches are provided with auxiliary contacts, the main switch 1 having normally open auxiliary contacts 1ᵃ and the main switch 11 having similar auxiliary contacts 11ᵃ. The switches 2, 3, 4 and 5 have similar normally open contacts 2ᵃ, 3ᵃ, 4ᵃ and 5ᵃ, respectively, and switches 12, 13, 14 and 15 have similar auxiliary contacts 12ᵃ, 13ᵃ, 14ᵃ and 15ᵃ, respectively. Also switches 3, 5, 13 and 15 have similar auxiliary contacts 3ᵇ, 5ᵇ, 13ᵇ and 15ᵇ. Switches 20, 21, 22 and 23 have normally open auxiliary contacts 20ᵇ, 21ᵇ, 22ᵇ, and 23ᵇ, respectively. The purpose of these auxiliary contacts will appear upon inspection of the control circuits shown in Fig. 2 and now to be described.

Referring to Fig. 2, the same shows a drum type master switch 30 and a voltage relay 40 for controlling the main switch, the reversing switch and the accelerating switches of motor A—F, it being understood that the control means illustrated may be duplicated for control of the corresponding elements of the controller of motor A¹—F¹, the duplicate drum being if desired fixed to the drum 30. Also, Fig. 2 shows a separately operable master switch 50 of the drum type to control the aforedescribed switches utilized for dynamic braking.

Drum 30 has a contact finger to be continuously engaged by segment 30ᵃ and additional contact fingers 31, 32, 33, 34, 35, 36 and 37. The drum is further provided with a segment 31ᵃ which engages contact finger 31 in the off position of the drum and disengages said finger when the drum is moved one step in either direction, segments 32ᵃ, 34ᵃ, 35ᵃ, 36ᵃ and 37ᵃ to engage respectively fingers 32, 34, 35, 36 and 37 when the drum is moved in the forward direction, and segments 33ᵇ, 34ᵇ, 35ᵇ, 36ᵇ and 37ᵇ to engage respectively fingers 33, 34, 35, 36 and 37 when the drum is moved in the reverse direction.

When the drum is in the off position and the line knife switch 60 is closed circuit may be traced from line L¹ to drum segment 30ᵃ across to segment 31ᵃ and contact 31, and thence to and through the winding of voltage relay 40 to line L². Thus in the off position of the drum the relay 40 is rendered responsive to close its main contacts 41 and its auxiliary contacts 42, the latter establishing a maintaining circuit for said relay independent of the drum. As will later appear, when the voltage relay is energized and the dynamic braking master is in normal position the contacts 20ᵇ, 22ᵇ shown in Fig. 2 will be closed. Accordingly it will be apparent that when the drum 30 is moved to its first position in the forward direction, a circuit will be closed from line L¹ to segment 32ᵃ and finger 32 and thence to and through the windings of reversing switches 2 and 3 in parallel to and through contacts 20ᵇ, 22ᵇ and 41 to line L². Also in the first position of the drum circuit may be traced from line L¹ to segment 34ᵃ and finger 34, thence to and through the winding of main switch 1 to and through contacts 20ᵇ, 22ᵇ and 41 to line L². Thus provision is made for completing the motor circuit for operation in forward direction, whereas when the drum is moved to its first reverse position segment 33ᵇ will cooperate with finger 33 to complete circuit through the windings of reversing switches 4 and 5 in parallel to and through contacts 20ᵇ, 22ᵇ and 41 to line L¹ while segment 34ᵇ will cooperate with finger 34 to complete the circuit of main switch 1 as already traced. Continued movement of the drum in either direction will engage the segments 35ᵃ, 36ᵃ and 37ᵃ or segments 35ᵇ, 36ᵇ and 37ᵇ with fingers 35, 36 and 37 progressively to complete the circuits of the windings of accelerating switches 6, 7 and 8, all of said windings having a common connection to line L² through the auxiliary contacts 1ᵃ of the main switch 1 and the auxiliary contacts 2ᵃ of reversing switch 2, or alternatively through said contacts 1ᵃ and the auxiliary contacts 4ᵃ of reversing switch 4.

The dynamic braking drum 50 comprises contact fingers 51 and 52, and segments 51ᵃ and 52ᵃ. The drum normally stands in a position to engage its segments and fingers, and is movable to disengage segments 51ᵃ and 52ᵃ from their respective contact fingers to bring about establishment of dynamic braking connections.

In the normal position of the drum 51 circuit is completed from line L¹ to contact finger 51, segment 51ª, segment 52ª, contact finger 52 to and through the windings of switches 20, 21, 22 and 23 in parallel to line L². Thus in the normal position of the drum the switches 20, 21, 22 and 23 are energized whereby the aforementioned auxiliary switches 20ᵇ and 22ᵇ of the controller of motor A—F are normally closed, as heretofore set forth, and the corresponding auxiliary contacts of the controller of motor A¹—F¹ are likewise closed. Also as will be understood, such energization of switches 20, 21, 22 and 23 in the normal position of the drum 50 interrupts dynamic braking connections. Moreover the switches 20, 21, 22 and 23 are provided with a connection to line L¹ through the auxiliary contacts 3ª, 5ª, 13ª and 15ª of the reversing switches 3, 5, 13 and 15 in parallel whereby the first mentioned set of switches will be maintained energized regardless of the position of the dynamic braking drum until both motors are disconnected from the line by deenergization of their reversing switches.

When, however, the motors have been disconnected from their power supply the switches 20, 21, 22 and 23 may be deenergized at will to establish dynamic braking connections by operation of the drum 50 to disengage contact 52ª from finger 52.

In connection with the dynamic braking control means it is to be noted that interruption of dynamic braking connections is dependent upon energization of switches 20, 21, 22 and 23, and thus it will be apparent that provision is made for establishment automatically of dynamic braking connections upon failure of voltage since such failure will effect release of the aforementioned switches. It is also to be noted that the arrangement enables foot control of dynamic braking if desired through foot operation of the drum 50.

What we claim as new and desire to secure by Letters Patent is:

1. In a controller for a plurality of series wound motors, in combination, means to establish power connections for said motors and to effect reversals thereof by reversing the current flow through the armature of one and the field of another, and means to establish for said motors upon interruption of their power connections other connections for dynamic braking, the latter connections subjecting the motor field windings each to excitation by the current generated by another of said motors and being the same as regards the terminal connections of the motor armatures and field windings regardless of the direction of the previous power operation of said motors.

2. In a controller for a plurality of series wound motors, in combination, means to establish power connections for said motors and to effect reversals thereof by reversing the current flow through the armature of one and the field of another, and means to establish for said motors upon interruption of their power connections other connections for dynamic braking, the latter connections subjecting the motor field windings each to excitation by the current generated by another of said motors, the second mentioned means being operable automatically upon failure of voltage to establish said dynamic braking connections.

3. A method of effecting dynamic braking jointly by a plurality of reversible series wound motors following power operation in either forward or reverse direction, reversals of the motors being accomplished by reversals of the current flow through the field winding of one and the armature of another which consists in establishing a plurality of closed loops, each including an armature of one motor and a field winding of another motor always in the same relation in respect of their terminals regardless of the direction in which the motors were operating under power.

4. A method of controlling a plurality of reversible series wound motors which consists in supplying current thereto always in the same direction through the armature of one and the field winding of another and selectively in reverse directions through the field winding of the first mentioned motor and the armature of the second mentioned motor for power operations and establishing a plurality of closed loops for dynamic braking, including in each loop an armature of one of said motors and a field winding of another of said motors always with their terminals connected in a given relation regardless of the direction of the previous power operation of said motors.

5. In combination, a plurality of series wound motors and means to establish selectively running connections and dynamic braking connections for said motors, said means including means to reverse the flow of current through the armature of one motor and the field of another motor for reversals of said motors and including means to establish dynamic braking loops effective for braking the motors following power operation in either direction, each of said loops including in a series relation an armature of one of said motors and a field winding of another of said motors always with their terminals connected in a given relation regardless of the direction of the previous power operation of said motors.

6. In combination, a plurality of series wound motors, means to establish power connections for said motors, said means including reversing means to reverse the current flow through the armature of one of said motors and the field winding of another of said motors, and means for establishing dynamic braking connections for said motors exclusive of said reversing means, said dynamic braking connections subjecting the motor field windings each to excitation by the current generated by another of said motors and comprising a single set of leads from each field winding to the armature of the motor exciting the same and a single set of contacts controlling the continuity of each of said leads.

7. In a controller for a plurality of series wound motors, in combination, means to establish power connections for said motors and to effect reversals thereof, and means to establish for said motors upon interruption of their power connections other connections for dynamic braking, the latter connections subjecting the motor field windings each to excitation by the current generated by another of said motors and affording connection of the terminals of each field winding always in the same relation with the armature supplying exciting current regardless of the direction of the previous power operation of said motors, the second mentioned means being operable automatically upon failure of voltage to establish said dynamic braking connections.

8. In a controller for a plurality of series wound motors, in combination, means to establish power connections for said motors and to effect reversals thereof by reversing the current flow through the armature of one and the field winding of another, and means to establish for said motors upon interruption of their power connections a plurality of closed loops each including in series relation the armature of one of said motors and the field winding of another of said motors always with their terminals connected in a given relation regardless of the direction of the previous power operation of said motors, said second mentioned means comprising electromagnetically operated switches and connections therefor to energize the same to interrupt the dynamic braking connections during running of said motors, said switches being operable automatically upon failure of voltage to reestablish said dynamic braking connections.

9. In combination, a plurality of series wound motors, means to establish power connections for said motors, said means including reversing contacts to reverse the flow of current through the field winding of one motor and the armature of another, and means for establishing dynamic braking connections exclusive of all of said reversing contacts, such dynamic braking connections being identical for braking following power operation of said motors in either direction and said braking means comprising a single set of leads between the terminals of each motor field winding and the terminals of the armature of another motor to provide electrically isolated dynamic braking loops.

10. In combination, a plurality of series wound motors, means to establish power connections for said motors, said means including reversing contacts to reverse the flow of current through the field winding of one motor and the armature of another, and means for establishing dynamic braking connections exclusive of all of said reversing contacts, such dynamic braking connections being identical for braking following power operation of said motors in either direction and said braking means comprising a single set of leads between the terminals of each motor field winding and the terminals of the armature of another motor to provide electrically isolated dynamic braking loops and further comprising electromagnetically controlled contacts associated with said leads to control the continuity of the loops afforded by said leads and to complete said loops upon failure of voltage.

HERMAN WILSON.
CHARLES RITCHIE.